United States Patent
Liu et al.

(10) Patent No.: US 10,382,415 B2
(45) Date of Patent: Aug. 13, 2019

(54) APPLICATION ENGAGEMENT IDENTIFICATION USING A DYNAMIC PATTERN

(71) Applicant: Ohio University, Athens, OH (US)

(72) Inventors: Chang Liu, Athens, OH (US); Siang Lee Hong, Canal Winchester, OH (US)

(73) Assignee: Ohio University, Athens, OH (US)

(*) Notice: Subject to any disclaimer, the term of this patent is extended or adjusted under 35 U.S.C. 154(b) by 220 days.

(21) Appl. No.: 14/691,156

(22) Filed: Apr. 20, 2015

(65) Prior Publication Data
US 2015/0302217 A1 Oct. 22, 2015

Related U.S. Application Data

(60) Provisional application No. 61/982,110, filed on Apr. 21, 2014.

(51) Int. Cl.
| | |
|---|---|
| *G06F 7/04* | (2006.01) |
| *G06F 17/30* | (2006.01) |
| *H04N 7/16* | (2011.01) |
| *H04L 29/06* | (2006.01) |
| *G06F 21/31* | (2013.01) |

(52) U.S. Cl.
CPC .......... *H04L 63/08* (2013.01); *G06F 21/316* (2013.01); *G06F 2221/2133* (2013.01)

(58) Field of Classification Search
CPC .......... G06F 21/316; G06F 2221/2133; G06F 21/36; H04L 63/0861; H04L 9/0866; H04L 9/3231; H04L 29/06809; H04L 63/08

See application file for complete search history.

(56) References Cited

U.S. PATENT DOCUMENTS

| | | |
|---|---|---|
| 8,315,882 B2 | 11/2012 | Hariharan et al. |
| 8,397,275 B1 | 3/2013 | Magdsick |
| 8,483,518 B2 | 7/2013 | Zhu et al. |
| 8,494,854 B2 | 7/2013 | Gross |

(Continued)

OTHER PUBLICATIONS

JingSong Cui, LiJing Wang, JingTing Mei, Da Zhang, Xia Wang, Yang Peng, WuZhou Zhang, CAPTCHA Design Based on Moving Object Recognition, Aug. 2010 (Year: 2010).*

*Primary Examiner* — Shewaye Gelagay
*Assistant Examiner* — Amie C. Lin
(74) *Attorney, Agent, or Firm* — Wood Herron & Evans LLP

(57) ABSTRACT

Systems and methods securely determine whether a human or a hacking computing device attempts to engage an application. Embodiments of the present disclosure relate to identifying a defined pattern to be displayed by a user interface for an individual to trace. The defined pattern is dynamically displayed so that characteristics associated with the defined pattern change as the defined pattern is displayed. A background is displayed simultaneously with the defined pattern. The background randomly changes as the characteristics associated with the defined pattern change. The likelihood that a hacking computing device can recognize the dynamically changing defined pattern from the dynamically changing background is low while the likelihood that the human brain can do so is high. Thus, user attempting to engage the application is confirmed as a human when a trace of the defined patter is received.

22 Claims, 6 Drawing Sheets

(56) References Cited

U.S. PATENT DOCUMENTS

| | | | |
|---|---|---|---|
| 8,510,795 B1 | 8/2013 | Gargi | |
| 8,522,327 B2 | 8/2013 | Broder et al. | |
| 8,590,026 B2 | 11/2013 | Kumar et al. | |
| 8,590,058 B2 | 11/2013 | Fisk et al. | |
| 8,601,538 B2 | 12/2013 | Qvarfordt et al. | |
| 8,607,331 B2 | 12/2013 | Sun et al. | |
| 8,856,541 B1* | 10/2014 | Chaudhury | G06F 21/32 382/115 |
| 8,904,479 B1* | 12/2014 | Johansson | G06F 21/36 382/181 |
| 2009/0232351 A1* | 9/2009 | Kagitani | G06F 21/36 382/100 |
| 2013/0091027 A1 | 4/2013 | Lin | |
| 2013/0283378 A1* | 10/2013 | Costigan | G06F 21/55 726/23 |
| 2013/0298195 A1 | 11/2013 | Liu et al. | |
| 2015/0096020 A1* | 4/2015 | Adams | H04L 63/1458 726/23 |
| 2016/0105923 A1* | 4/2016 | Chen | H04W 88/02 455/41.2 |

\* cited by examiner

APPLICATION ENGAGEMENT IDENTIFICATION USING A DYNAMIC PATTERN

CROSS-REFERENCE TO RELATED APPLICATIONS

This application is a U.S. Nonprovisional Application which claims the benefit of U.S. Provisional Application No. 61/982,110 filed on Apr. 21, 2014, which is incorporated herein by reference in its entirety.

BACKGROUND

With the development of the Internet, the ability to communicate and/or conduct business over the Internet increased exponentially. Individuals could easily establish accounts via the Internet and communicate and/or conduct business using those online accounts. Early in the life of the Internet, the likelihood of a human engaging the Internet to create an account via a computing device was high. However, as the life of the Internet progressed, fraudulent software programs were developed by hackers that could imitate a human and create accounts intended for use by a human and implement those accounts to engage in fraudulent communication and/or business activities via the Internet. For example, fraudulent software programs were developed to create fraudulent email accounts with email providers to access each of the other email accounts associated with the email providers. The fraudulent software programs would then spam the other email accounts associated with the email providers from the fraudulent email accounts established by the fraudulent software programs.

In order to differentiate whether a human or a hacking computing device was attempting to establish online accounts, conventional Completely Automated Public Turing test to tell Computers and Humans Apart (CAPTCHA) was developed. The hacking computing device is a computing device that attempts to fraudulently engage an application where a human is not the operator of the hacking computing device but rather a fraudulent software program is the operator of the hacking computing device. Applications are software programs that trigger a computing device to perform tasks that benefit a user. The applications differentiate from system software in that the system software manages and integrates a computing device's capabilities to execute the applications that in turn benefit the user.

Conventional CAPTCHA differentiated between the human or the hacking computing device attempting to engage an application by displaying a random combination of distorted letters and numbers via a user interface of the computing device that was attempting to engage the application. In order to engage the application, the user would be required to type the random letters and numbers depicted in the distorted image into the user interface. The application would enable the user to proceed to engage the application when the user was able to correctly type the combination of letters and numbers depicted by the distorted image into the user interface. However, the application prevents the user from engaging the application when the user fails to correctly type the combination of letters and numbers depicted by the distorted image into the user interface.

Typically, the fraudulent software program operating the hacking computing device is limited to recognizing text and cannot recognize distorted images of text. Particularly, fraudulent software programs that implemented Optical Character Recognition (OCR) programs to recognize text struggle to recognize distorted images of text and are limited to recognizing standard characters that satisfied OCR programs. As a result, the hacking computing device typically fails to correctly type the combination of letters and numbers depicted by the distorted image into the user interface and is prevented from fraudulently engaging the application. However, typically a human can easily recognize the random combination of letters and numbers depicted by the distorted image and correctly type the combination of letters and numbers into the user interface. The human would then be allowed to engage the application.

However, the processing power of computing devices has increased exponentially in recent years. The increase in processing power has provided computing devices with the capability to depict conventional CAPTCHA phrases where the conventional CAPTCHA phrases slightly distort the random combination of letters and numbers displayed via the user interface. As a result, the fraudulent software program uses the processing power of hacking computing devices to recognize the conventional CAPTCHA phrases with slight distortion and then is able to correctly type the combination of letters and numbers into the user interface automatically. Because the combination of letters and numbers are correctly typed into the user interface, the application grants access to the fraudulent software program so that the fraudulent software program can fraudulently engage the application.

In response to the increased success rate of the fraudulent software program engaging the application due to the increase in processing power of computing devices and sophistication in fraudulent software programs, the conventional CAPTCHA phrases presented by the application have increased in complexity. The amount of distortion of the random combination of letters and numbers depicted in the distorted image is increased to provide additional difficulty for hacking computing devices to recognize the significantly distorted letters and numbers and correctly type the random combination of letters and numbers into the user interface. The increase in distortion requires a significant increase in the processing power for the hacking computing devices to successfully recognize the significantly distorted letters and numbers and prevents the fraudulent software program from fraudulently engaging the application.

However, an increase in the distortion of the random combination of letters and numbers depicted in the distorted image to prevent hacking computing devices from recognizing the combination of letters and numbers often results in the human user struggling to recognize the distorted letters and numbers as well. The random combination of letters and numbers depicted by the distorted image are often times so distorted that the human user struggles to recognize the distorted letters and numbers and fails to correctly type the letters and numbers into the user interface. The incorrect entry of the random combination of letters and numbers into the user interface prevents the human user from engaging the application. The human user may fail to correctly type the significantly distorted letters and numbers several times before successfully recognizing the combination of letters and numbers to engage the application. The added struggle to the human user increases the amount of time required to engage the application while frustrating the human user. With the continued increase of processing power of computing devices, conventional CAPTCHA phrases continue to have their distortion increased to prevent the fraudulent software program from fraudulently entering the application while also increasing the difficulty for human users to enter the application.

BRIEF SUMMARY

Embodiments of the present invention relate to determining whether a human or a hacking computing device is attempting to engage an application. In an embodiment, a system determines whether a human or a hacking computing device is attempting to engage an application based on a dynamic pattern that is traced by the individual. The system includes a processor and memory coupled with the processor. The memory includes instructions that, when executed by the processor, causes the processor to dynamically display the defined pattern by the user interface to the individual. A plurality of characteristics of the defined pattern change as the defined pattern is displayed by the display module to the individual. The processor is configured to detect a traced pattern generated from continuously tracing the defined pattern by the individual from an initial point on the defined pattern to an end point on the defined pattern via the user interface. The processor is configured to compare the traced pattern to the defined pattern. The processor is configured to thereby confirm the individual is human when the traced pattern is detected.

In an embodiment, a method provides for determining whether a human or a hacking computing device is attempting to engage an application based on a dynamic pattern that is traced by the individual. The defined pattern may be dynamically displayed by the user interface to the individual. A plurality of characteristics of the defined pattern change as the defined pattern is displayed by the user interface to the individual. A traced pattern generated from continuously tracing the defined pattern by the individual from an initial point on the defined pattern to an end point on the defined pattern via the user interface may be detected. The detected traced pattern may be compared to the defined pattern. The individual may be confirmed as the human when the traced pattern is thereby detected.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements.

DETAILED DESCRIPTION

Figure 1:
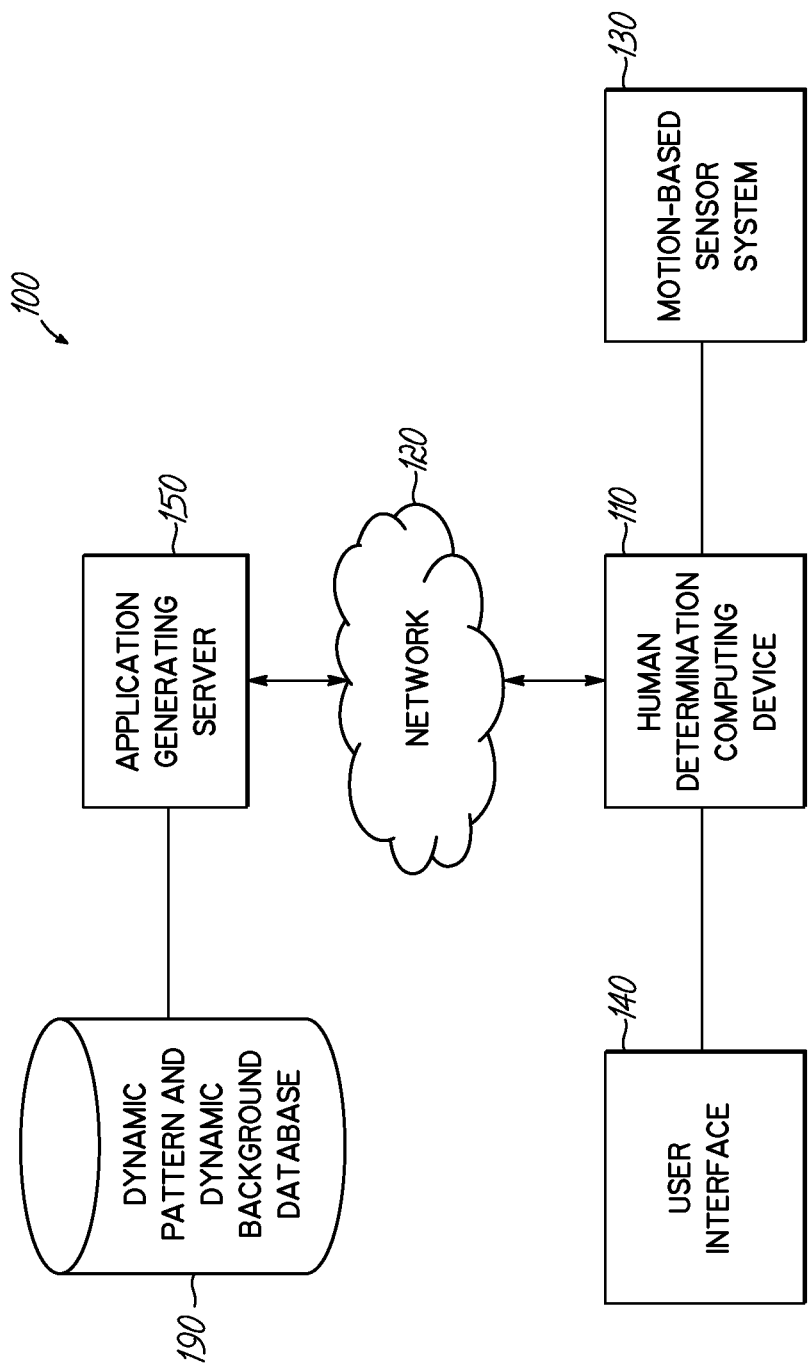
FIG. 1 shows an illustration of a human determination system.

In the Detailed Description herein, references to "one embodiment", "an embodiment", an "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in the art to affect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

In an embodiment, a determination of whether a human or a hacking computing device is attempting to engage an application may be completed based on a dynamic pattern that is to be traced by an individual. As noted above, a hacking computing device recognizes characters that include letters and numbers using conventional OCR software programs that provide the capability of recognizing the characters. However, the hacking computing device has increased difficulty recognizing patterns depicted in an image. The hacking computing device examines the image pixel by pixel to depict the pattern presented in the image.

The hacking computing device has even further difficulty recognizing dynamic patterns depicted in an image. A dynamic pattern is a pattern that continuously changes characteristics associated with the pattern but the overall essence of the pattern is maintained so that the pattern can be continuously identified. For example, a location of a "Z" depicted in an image continuously changes within the image but the overall structure of the "Z" is maintained so that the "Z" can be continuously identified. The hacking computing device examines the dynamic pattern by extracting frame by frame of the continuously changing image where each frame depicts a static screenshot of the pattern with changed characteristics. A static screenshot is a captured image of the pattern that does not move in contrast to a continuous video feed of images.

Overlaying the dynamic pattern with a dynamic background severely hinders the capability of the hacking computing device to recognize the dynamic pattern that has continuously changing characteristics relative to the dynamic background. The dynamic background is a random pattern that also continuously changes so that the dynamic background fails to depict a recognizable pattern as the pattern of the dynamic background randomly changes. However, the dynamic pattern continues to maintain the essence of the pattern as the characteristics of the dynamic pattern change relative to the change in random characteristics of the dynamic background.

As the hacking computing device attempts to examine the dynamic pattern and the dynamic background frame by frame, the hacking computing device fails to recognize the dynamic pattern relative to the dynamic background because each frame provides a static screenshot of the dynamic pattern and the dynamic background. Each static screenshot fails to depict the differences between the dynamic pattern and the dynamic background but rather depicts a random combination of patterns that fails to depict any recognizable pattern.

However, the human brain examines the dynamic pattern and the dynamic background continuously such as when examining a continuous video feed rather than segmenting the continuous video feed into static screenshots and examining the static screenshots of the dynamic pattern and the dynamic background. The human brain is also able to ignore the random background and search for patterns that have continuity and are recognizable to the human brain. As a result, the human brain ignores the dynamic background that is continuously changing and searches for the dynamic pattern that has characteristics that are continuously changing while the overall essence of the dynamic pattern is maintained so that the dynamic pattern is recognizable to the human brain. The human brain is then able to trace the dynamic pattern and confirm that the individual is attempting to engage the application rather than the hacking computing device.

System Overview

As shown in FIG. 1, human determination system 100 includes a human determination computing device 110, a network 120, a motion-based sensor system 130, a user interface 140, an application generating server 150, and a dynamic pattern and dynamic background database 190.

Human determination computing device 110 may be a device that is capable of electronically communicating with other devices while having a multi-touch display. The multi-touch display has the ability to recognize the presence of two or more points in contact with a surface of the multi-touch display. Examples of human determination computing device 110 may include a mobile telephone, a smartphone, a workstation, a portable computing device, other computing devices such as a laptop, or a desktop computer, cluster of computers, set-top box, a computer peripheral such as a printer, a portable audio, and/or video player, a payment system, a ticketing writing system such as a parking ticketing system, a bus ticketing system, a train ticketing system or an entrance ticketing system to provide some examples, or in a ticket reading system, a toy, a game, a poster, packaging, an advertising material, a product inventory checking system and or any other suitable electronic device with a multi-touch display that will be apparent to those skilled in the relevant art(s) without departing from the spirit and scope of the invention.

In an embodiment, multiple modules may be implemented on the same computing device. Such a computing device may include software, firmware, hardware, or a combination thereof. Software may include one or more applications on an operating system. Hardware can include, but is not limited to, a processor, memory, and/or graphical user interface display. The motion-based behavior data captured by motion-based sensor system 130 can be stored in human determination computing device 110.

An individual engaged in an identity authentication session interacts with human determination computing device 110 via user interface 140. User interface 140 may include a multi-touch display that has the ability to recognize the presence of two or more points in contact with the surface of the multi-touch display. User interface 140 may include any type of display device including but not limited to a touch screen display, a cathode ray tube (CRT) monitor, a liquid crystal display (LCD) screen, and/or any other type of display device that includes a multi-touch display that will be apparent from those skilled in the relevant art(s) without departing from the spirit and scope of the present disclosure.

One or more motion-based sensor systems 130 may connect to one or more human determination computing devices 110. Motion-based sensor system 130 may include one or more sensors that capture motion-based data that is the physical movement of an individual. Motion-based sensor system 130 may include a video imaging system, an infrared imaging system, a photographic imaging system, an air sensing system, a thermal sensing system, a motion sensor that is capable of capturing two-dimensional data with a commercially available device such as a Kinect motion sensing input device by Microsoft, other motion sensing systems that include sensors that are associated with a multi-touch computing device that that can also be used without departing from the spirit and scope of the present disclosure. Motion-based sensor system 130 detects motion-based behavior data as the individual executes a series of motions when continuously touching the multi-touch display of user interface 140. For example, motion-based sensor system 130 can detect a sequence of positions the individual follows on the multi-touch display of user interface 140 when tracing a pattern displayed by user interface 140. Motion-based sensor system 130 tracks the speed of the individual's movements over time as the individual traces the pattern as well as other variables, such as location relative to the pattern, as is explained hereinafter.

As shown, human determination computing device 110 streams the motion-based behavior data to application generating server 150 via network 120. Network 120 includes one or more networks, such as the Internet. In some embodiments of the present invention, network 120 may include one or more wide area networks (WAN) or local area networks (LAN). Network 120 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 120 takes place using one or more network communication protocols including reliable streaming protocols such as transmission control protocol (TCP). These examples are illustrative and not intended to limit the present invention.

One or more application generating servers 150 may connect to one or more human determination computing devices 110 via network 120. Application generating servers 150 may include a data acquisition system, a data management system, intranet, conventional web-server, e-mail server, or file transfer server modified according to one embodiment. Application generating server 150 is typically a device that includes a processor, a memory, and a network interface, hereinafter referred to as a computing device or simply "computer." Application generating server 150 may store dynamic patterns and dynamic backgrounds displayed by user interface 140 in dynamic pattern and dynamic background database 190.

Human determination computing device 110, application generating server 150, and dynamic pattern and dynamic background database 190 may share resources via network 120. For example, application generating server 150 may provide dynamic patterns and dynamic backgrounds stored in dynamic pattern and dynamic background database 190 to human determination computing device 110 via network 120. Human determination computing device 110 may also provide conformation or rejection recommendations to application generating server 150 after analyzing the motion-based behavior data captured from the individual when tracing the pattern during each identity authentication session via network 120. Based on the cloud computing configuration, the interaction between human determination computing device 110, application generating server 150, and dynamic pattern and dynamic background database 190 may not be limited to a single computing device. For example, a plurality of computing devices may update dynamic pattern and dynamic background database 190 via network 120 with dynamic patterns and dynamic backgrounds.

Dynamic Pattern Human Determination

Human determination computing device 110 determines whether a human or a hacking computing device is attempting to engage an application based on whether a dynamic pattern displayed by user interface 140 is traced. An embodiment consistent with the invention dynamically displays a defined pattern and a background simultaneously where characteristics associated with the defined pattern and characteristics associated with the background continuously change. The essence of the defined pattern is maintained so that despite the changing in the characteristics of the defined pattern, the defined pattern may be recognized by a human but not a hacking computing device. The background does not depict a pattern and continuously changes to increase the difficulty of the hacking computing device to recognize the defined pattern. The individual attempting to engage the application is confirmed as a human when the defined pattern is traced by the individual via user interface 140 and received by human determination computing device 110.

Figure 2:
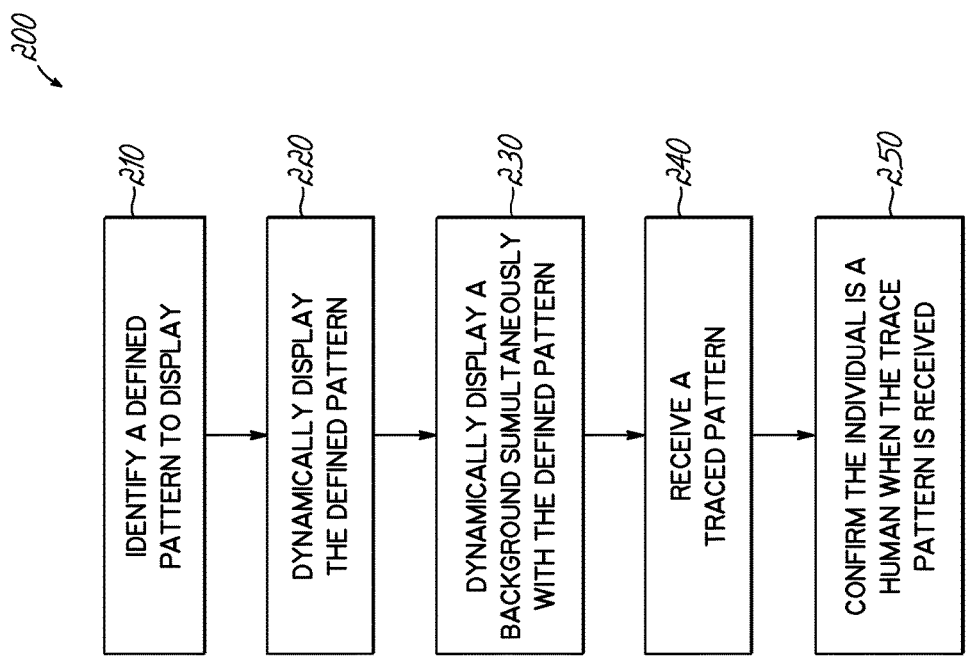
FIG. 2 is a flowchart showing an example method of determining whether a human or a hacking computing device is attempting to engage an application based on whether the dynamic pattern is traced by the individual.

One such implementation of determining whether a human or a hacking computing device is attempting to engage an application based on whether the dynamic pattern is traced by the individual is illustrated by process 200 in FIG. 2. Process 200 includes five primary steps: identify a defined pattern to display 210, dynamically display the defined pattern 220, dynamically display a background simultaneously with the defined pattern 230, receive a traced pattern 240, and confirm the individual is a human when the traced pattern is received 250. Steps 210-250 are typically implemented in a computer, e.g., via software and/or hardware, e.g., human determination computing device 110 of FIG. 1.

In step 210, a defined pattern may be identified to display via user interface 140. A plurality of dynamic patterns may be stored in dynamic pattern and dynamic pattern background database 190. Each time an individual or a hacking computing device attempts to engage an application, dynamic pattern and dynamic background database 190 may be queried for a dynamic pattern to display via user interface 140. The individual may be any human who is attempting to engage an application so that the individual may then participate in activities provided by the application when the determination that the individual is the human is confirmed. The application may be any type of software program that provides services to the individual, such as an online shopping website. The pattern that the individual is required to trace during the human confirmation session may be a series of points and/or continuous paths displayed to the individual via user interface 140 in order to confirm the individual is a human. The pattern may be a two-dimensional pattern where the individual traces the pattern via user interface 140 in two-dimensional space. The pattern may also be a three-dimensional pattern where the individual traces the pattern in three-dimensional space.

Figure 6:
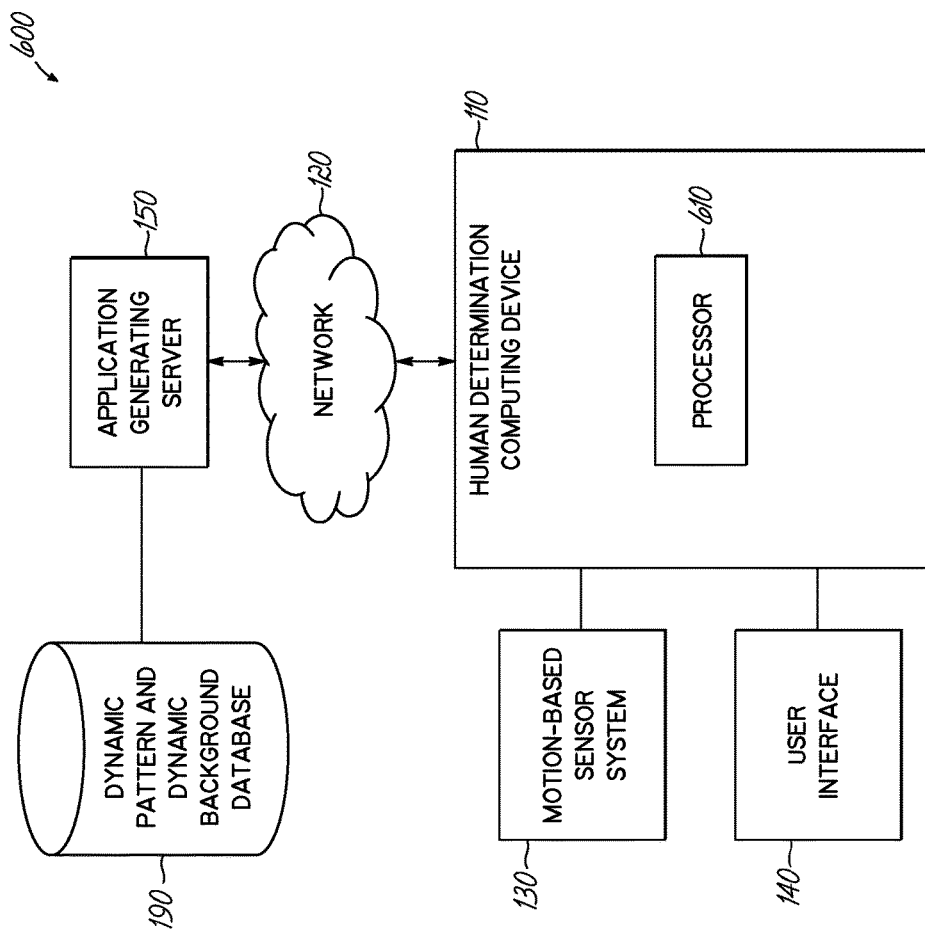
FIG. 6 depicts a detailed view of an exemplary human determination system.

In an embodiment, the defined pattern is initially identified and displayed via the multi-touch display of user interface 140 when the individual or hacking computing device is initially engaging the application. For example, the defined pattern is randomly identified from dynamic pattern and dynamic background database 190 when the individual or hacking computing device initially arrives at the online shopping website. Each time the individual and/or hacking computing device fails to trace the initially displayed defined pattern, additional defined patterns are randomly identified and then displayed via user interface 140 for each additional attempt to engage the online shopping website. Each time the individual and/or hacking computing device departs the online shopping website and then returns to the online shopping website, additional defined patterns are randomly identified and then displayed via user interface 140 for each return to the online shopping website. In an example embodiment, step 210 is performed by processor 610 as shown in FIG. 6 and discussed in more detail below.

After the defined pattern is identified from dynamic pattern and dynamic background database 190, in step 220, the defined pattern may be dynamically displayed via user interface 140. The defined pattern may be dynamically displayed so that a plurality of characteristics associated with the defined pattern continuously change while maintaining the essence of the defined pattern so that the individual as a human may recognize the defined pattern. The defined pattern may be a letter, number, symbol, and/or any other recognizable pattern and/or combination of patterns that a typical human would recognize that will be apparent to those skilled in the relevant art(s) without departing from the spirit and scope of the present disclosure.

The characteristics of the defined pattern may be any feature associated with the pattern that contributes to the structure of the defined pattern so that the defined pattern may be recognized by a human and can also be varied to change the structure of the defined pattern. The characteristics of the defined pattern may include but are not limited to the color, shape, size, location, orientation and/or any other characteristic of the defined pattern that contributes to the structure of the defined pattern so that the defined pattern may be recognized by a human but can also be varied that will be apparent to those skilled in the relevant art(s) without departing from the spirit and scope of the present disclosure.

For example, the defined pattern is the letter "Z". The letter "Z" is dynamically displayed via user interface 140 so that the characteristics of the letter "Z" are continuously changing while maintaining the essence of the letter "Z" thus the letter "Z" changes but continues to be recognizable by a human. The location of the letter "Z" on user interface 140, the colors of the letter "Z", the size of the letter "Z", and the orientation of the letter "Z" are continuously changing as user interface displays the letter "Z". However, the essence of the letter "Z" is maintained so that a human may continue to recognize the letter "Z" despite the changing location, colors, size, and orientation of the letter "Z".

Figure 3:
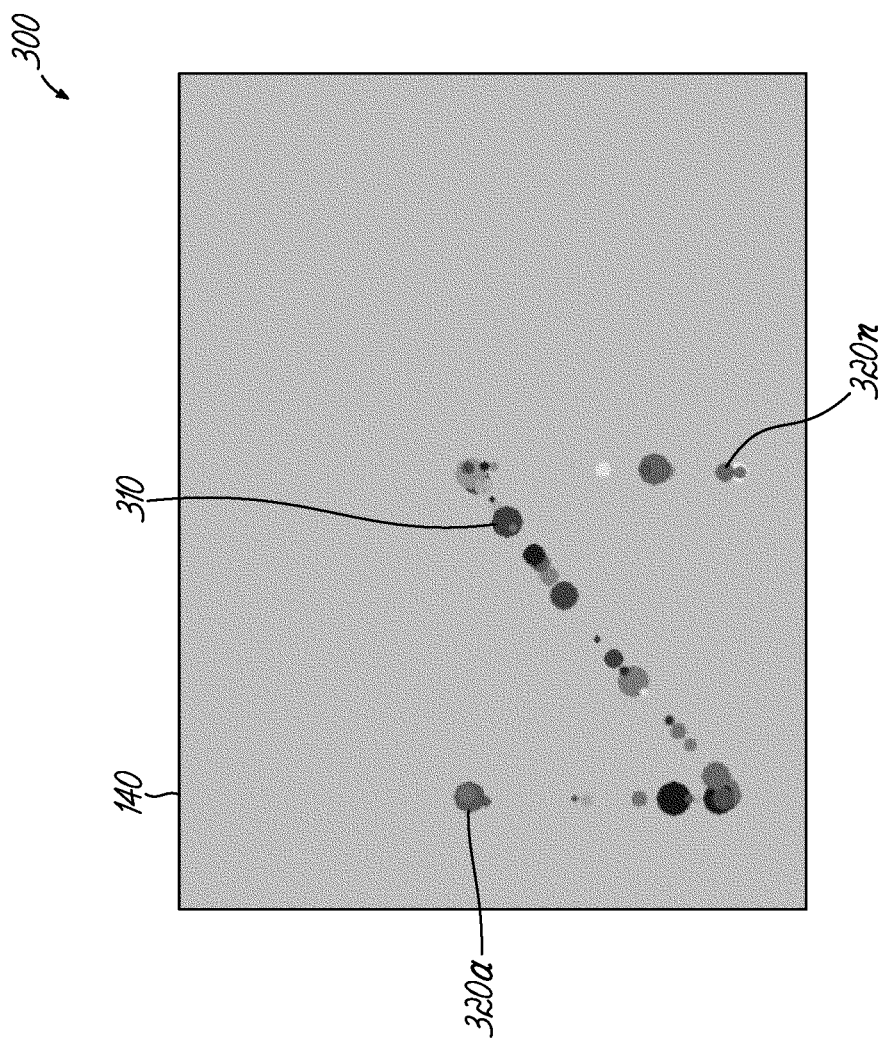
FIG. 3 depicts an example dynamic pattern.

The defined pattern may be formulated with an accumulation of a plurality of structures so that the defined pattern may be recognized by a human. For example, FIG. 3 depicts an example dynamic pattern 300. Dynamic pattern 300 includes a display of a defined pattern 310 that depicts the letter "Z" by user interface 140. The letter "Z" of defined pattern 310 is formulated with an accumulation of a plurality of dots 320(*a-n*) where n is an integer greater than or equal to one. Dots 320(*a-n*) are positioned relative to each other so that when accumulated the letter "Z" is formulated so that a human may recognize the letter "Z" formed by the accumulation of dots 320(*a-n*). The structures that may be accumulated to form the defined pattern may include but are not limited to solid lines, dotted lines, dashed lines, dots, squares, rectangles, triangles, and/or any structure or combination of structures that may be accumulated to form the defined pattern that may be recognized by a human that will be apparent to those skilled in the relevant art(s) without departing from the spirit and scope of the present disclosure.

Each individual structure may have a plurality of characteristics associated with each. The characteristics of each structure may be any feature associated with each individual structure that contributes to the formulation of each structure so that each structure may be recognized by a human and can also be varied to change the formulation of each structure while still being recognized as the structure by the human. The characteristics of each individual structure may be unique to each and independent from the characteristics associated with each other individual structure. The characteristics of the defined pattern may include but are not limited to the color, shape, size, location, orientation and/or any other characteristic that contributes to the formulation of the structure so that the structure may be recognized by a human that will be apparent to those skilled in the relevant art(s) without departing from the spirit and scope of the present disclosure.

For example, each dot 320(a-n) that formulate defined pattern 310 of the letter "Z" each include characteristics that are unique to each dot 320(a-n) but also independent from the characteristics of each other dot 320(a-n). Dot 320a has a location as displayed by user interface 140, a size, a color, and orientation as displayed that all may differ from the location as displayed by user interface 140, the size, the color, and the orientation of dot 320n. The location, size, color, and orientation of dot 320a may be continuously changed independently from the continuously changing in the location, size, color and orientation of dot 320n. A human may continue to recognize each dot 320(a-n) despite the continuously changing in the location, size, color, and orientation of each dot 320(a-n).

The characteristics associated with each structure that formulate the defined pattern may be continuously changed while maintaining the essence of the defined pattern so that the defined pattern may continue to be recognized by a human. For example, the location, size, color, and orientation of each dot 320(a-n) may continuously change while still maintaining the essence of defined pattern 310 so that a human may continue to recognize the letter "Z" as depicted by the accumulation of each dot 320(a-n) despite the changing of the location, size, color and orientation of each dot 320(a-n).

In continuously changing the characteristics associated with each structure that formulate the defined pattern, the characteristics of the defined pattern may gradually change as the characteristics associated with each structure change. For example, as the location, size, and orientation of each dot 320(a-n) continuously change, the size, location, and orientation of defined pattern 310 depicting the letter "Z" gradually change. The location of defined pattern 310 is initially displayed in the lower left quadrant of user interface 140, is orientated 90 degrees from the upright position of the letter "Z" and has an initial size. As the location, size, and orientation of each dot 320(a-n) continuously change, the location of defined pattern 310 gradually reaches the upper right quadrant of user interface 140, is oriented in the upright position of the letter "Z" and has decreased in size from the initial size.

In an embodiment, the characteristics of the defined pattern may be maintained for a period of time for the individual to complete a trace of the defined pattern. The continuous changing of the characteristics associated with each structure that formulate the defined pattern may change in a fashion so that the characteristics of the defined pattern may be maintained for a period of time for the individual to complete the trace of the defined pattern. After the period of time has expired without the individual completing the trace of the defined pattern, the continuous changing of the characteristics associated with each structure that formulate the defined pattern may change in a fashion so that the characteristics of the defined pattern instantly change as the characteristics associated with each structure change.

For example, as the location, size, and orientation of each dot 320(a-n) continuously change, the size, location, and orientation of defined pattern 310 depicting the letter "Z" is maintained for a period of 15 seconds so that the individual may trace defined pattern 310. The location of defined pattern 310 is initially displayed in the lower left quadrant of user interface 140, is orientated 90 degrees from the upright position of the letter "Z" and has an initial size. As the location, size, and orientation of each dot 320(a-n) continuously change, location in the lower left quadrant, the orientation of 90 degrees, and the initial size of the letter "Z" is maintained for 15 seconds for the individual to trace the pattern. After the 15 seconds has expired without the individual tracing the pattern, as the location, size, and orientation of each dot 320(a-n) continuously change, location of defined pattern 310 instantly appears in the upper right quadrant of user interface 140, is instantly oriented in the upright position of the letter "Z", and has instantly decreased in size from the initial size. The characteristics depicting the defined pattern may be maintained for any period of time for a human to trace the defined pattern while prohibiting a hacking computer from recognizing the defined pattern and completing the trace that will be apparent to those skilled in the relevant art(s) without departing from the spirit and scope of the present disclosure. In an example embodiment, step 220 is performed by processor 610 as shown in FIG. 6 and discussed in more detail below.

In step 230, a background is dynamically displayed simultaneously with the defined pattern via user interface 140. The background may be dynamically displayed so that a plurality of characteristics associated with the background continuously change in a random fashion so that the background does not depict a pattern that is recognized by a human. The background may be dynamically displayed simultaneously with the defined pattern so that the continuous changing of the characteristics associated with the background relative to the continuous changing of the characteristics associated with the defined pattern provides an added layer of complexity to prevent a hacking computing device from successfully recognizing the defined pattern. However, the human brain has the ability to recognize the defined pattern despite the continuous changing of the characteristics associated with the defined pattern and the continuous changing of the characteristics associated with the background.

Figure 4:
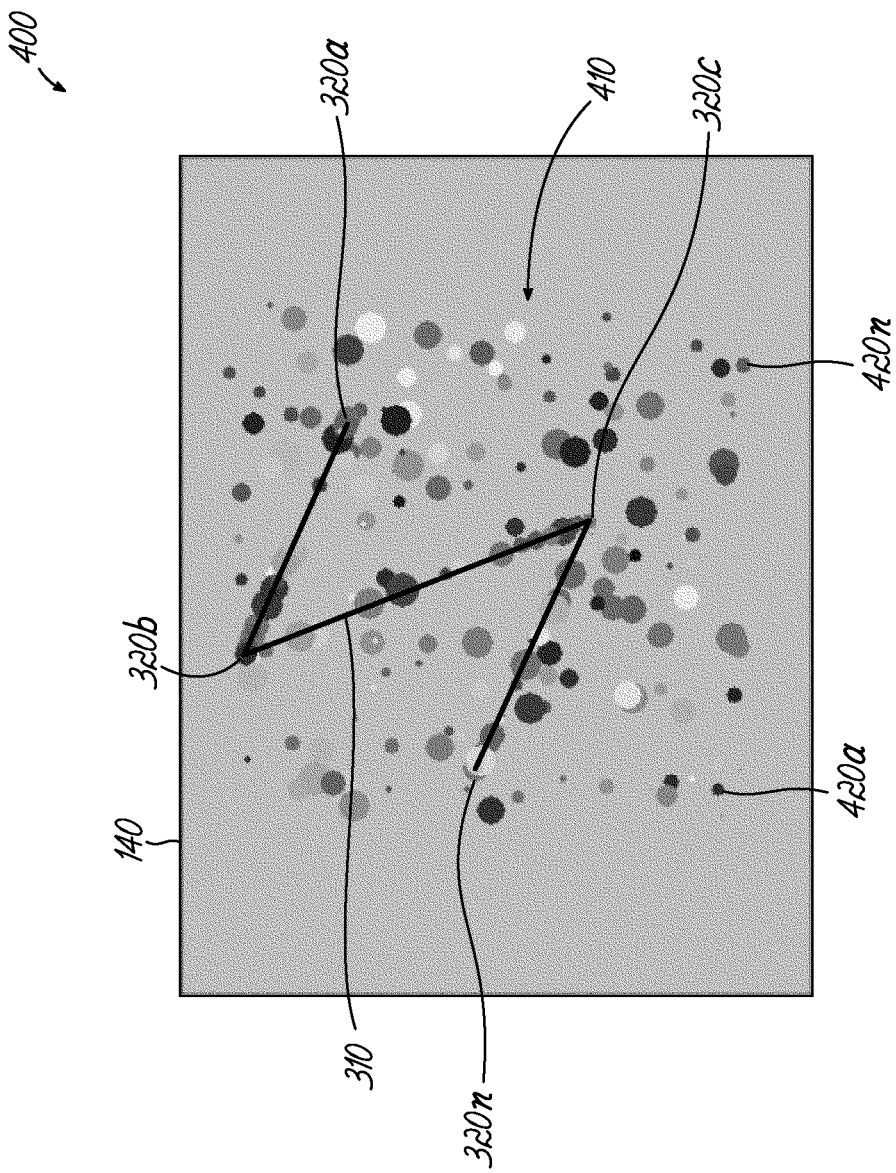
FIG. 4 depicts a background that is displayed simultaneously with defined pattern.

The background may be formulated with an accumulation of a plurality of structures so that a plurality of characteristics associated with each structure may be continuously changed relative to the defined pattern so that the background fails to depict any pattern recognizable to a human. For example, FIG. 4 depicts an example dynamic pattern and background 400. Dynamic pattern and background 400 includes a display of defined pattern 310 that depicts the letter "Z" by user interface 140. The letter "Z" of defined pattern 310 is formulated with an accumulation of dots 320(a-n). Dots 320(a-n) are positioned relative to each other so that when accumulated the letter "Z" is formulated so that a human may recognize the letter "Z" formed by the accumulation of dots 320(a-n). FIG. 4 depicts a solid line connecting dot 320a with dot 320b, a solid line connecting dot 320*b* with 320*c*, and a solid line connecting dot 320*c* with 320*n*. However, theses solid lines are depicted simply for ease of discussion. An actual display of defined pattern 310 by user interface 140 would not include the solid lines connecting each dot 320(*a-n*).

FIG. 4 also depicts a background 410 that is displayed simultaneously with defined pattern 310. Background 410 includes a random display of a plurality of dots 420(*a-n*) where n is an integer equal to or greater than one. Dots 420(*a-n*) are randomly positioned to provide background relative to defined pattern 310. Defined pattern 310 may be intertwined with background 410 so that the essence of defined pattern 310 may be maintained while background 410 randomly changes. The intertwining of defined pattern 310 with background 410 increases the difficulty of a hacking computer to recognize defined pattern 310 while enabling a human to recognize defined pattern 310.

Each individual structure included in background 410 may have a plurality of characteristics associated with each. The characteristics of each structure may be any feature associated with each individual structure that contributes to the formulation of each structure so that each structure may be recognized by a human and can also be varied to change the formulation of each structure while still being recognized as the structure by the human. The characteristics of each individual structure may be unique to each and independent from the characteristics associated with each other individual structure. The characteristics of the defined pattern may include but are not limited to the color, shape, size, location, orientation and/or any other characteristic that contributes to the formulation of the structure so that the structure may be recognized by a human that will be apparent to those skilled in the relevant art(s) without departing from the spirit and scope of the present disclosure.

For example, each dot 420(*a-n*) that formulate background 410 each include characteristics that are unique to each dot 420(*a-n*) but also independent from the characteristics of each other dot 420(*a-n*). Dot 420*a* has a location as displayed by user interface 140, a size, a color, and orientation that all may differ from the location as displayed by user interface 140, the size, the color, and the orientation of dot 420*n*. The location, size, color, and orientation of dot 420*a* may be continuously changed independently from the continuously changing in the location, size, color and orientation of dot 420*n*. A human may continue to recognize each dot 420(*a-n*) despite the continuously changing in the location, size, color, and orientation of each dot 420(*a-n*).

The characteristics associated with each structure that formulate background may be continuously changed while the essence of the defined pattern is maintained so that the defined pattern may continue to be recognized by a human despite the continuous changing of the characteristics associated with the background. For example, the location, size, color, and orientation of each dot 420(*a-n*) may continuously change while the essence of defined pattern 310 is maintained so that a human may continue to recognize the letter "Z" as depicted by the accumulation of each dot 320(*a-n*) despite the changing of the location, size, color and orientation of each dot 420(*a-n*) of background 410.

The human user has the capability to recognize the defined pattern relative to the background as the characteristics of each are continuously changing. The human brain analyzes the defined pattern relative to the background as the continuous video feed of the defined pattern and the background is displayed to the individual. The continuous changing of the characteristics associated with the defined pattern and the characteristics associated with the background continue to depict the essence of the defined pattern as displayed by the continuous video field of user interface 140. However, the structures that formulate the defined pattern relative to the structures that formulate the background may not depict a pattern that is meaningful to the user whether the user be a human or a hacking computing device when examined frame by frame.

Figure 5:
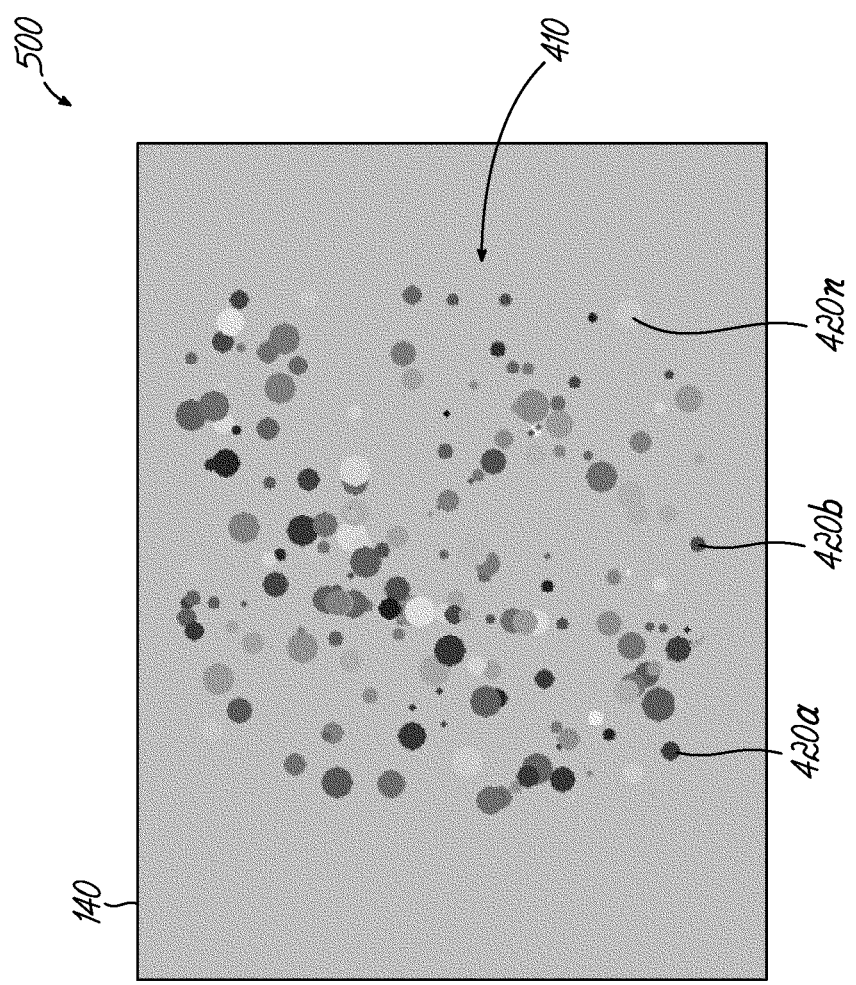
FIG. 5 depicts how a typical computing device segments the continuous video feed into static frames and views the display of a defined pattern and a background into a frame by frame depiction.

For example, FIG. 5 depicts a frame 500 where the defined pattern and the background are displayed in a static frame by user interface 140. As shown in FIG. 5, defined pattern 310 is no longer recognizable relative to background 410. Each dot 320(*a-n*) associated with defined pattern 310 no longer depict the essence of the letter "Z" relative to each dot 420(*a-n*) of background 410. Rather, each dot 320(*a-n*) is mixed with each dot 420(*a-n*) of background 410 so that only background 410 is depicted. The user that views defined pattern 310 and background 410 in a static frame as depicted by frame 500 cannot depict defined pattern 310 from background 410 as may be possible when viewing each with a continuous video feed as shown in FIG. 4.

As noted above, the human brain views the dynamic display of defined pattern 310 and background 410 as a continuous video feed as shown in FIG. 4 so that the typical human may recognize defined pattern 310 from background 410. However, the typical computing device does not view the dynamic display of defined pattern 310 and background 410 as a continuous video feed as shown in FIG. 4. Rather, the typical computing device segments the continuous video feed into static frames and views the display of defined pattern 310 and background 410 in a frame by frame depiction as shown in FIG. 5. Analyzing the display of defined pattern 310 and background 410 using static frames fails to depict defined pattern 310 so that defined pattern 310 is recognizable. As a result, the human user may proceed to successfully trace defined pattern 310 to engage the application while the hacking computing device fails to even recognize defined pattern 310 let alone proceed with tracking defined pattern 310. In an example embodiment, step 230 is performed by processor 610 as shown in FIG. 6 and discussed in more detail below.

After the defined pattern and the background are dynamically displayed simultaneously via user interface 140, in step 240, a traced pattern generated as the individual traces the pattern displayed by user interface 140 via the multi-touch display may be received. The traced pattern may be received as the individual executes the plurality of motions to continuously trace the pattern from an initial point to an end point via the multi-touch display of user interface 140. The individual decides to begin the trace of the pattern at an initial point on the pattern and then continues to trace the pattern by following a path along the pattern until the pattern is traced completing the pattern at an end point.

In an embodiment, the initial point and the end point may be at different locations on the pattern. In another embodiment, the initial point and the end point may be at substantially similar locations on the pattern where the individual begins and ends the trace in substantially similar locations on the pattern. The individual traces the pattern by continuously maintaining contact with the multi-touch display of user interface 140 from the initial point to the end point. The continuously traced pattern may be received via user interface 140 as the individual traces the pattern from the initial point to the end point. In an example embodiment, step 240 is performed by processor 610 as shown in FIG. 6 and discussed in more detail below.

In step 250, the individual may be confirmed as a human when the traced pattern is received. As noted above, the likelihood that the individual is a human is increased when the individual successfully traces the defined pattern that is dynamically displayed simultaneously with the background due to the difficulty that a hacking computing device would have in recognizing and then tracing the defined pattern. The tracing of the defined pattern rather than simply recognizing the defined pattern and then typing the defined pattern into user interface 140 provides an added level of security in ensuring that the individual attempting to engage the application is a human rather than a hacking computing device. If the hacking computing device somehow had the computing power available to sufficiently recognize the defined pattern as the defined pattern is dynamically displayed simultaneously with the background, the hacking computing device would then have to trace the defined pattern rather than implementing OCR software to type the defined pattern into user interface 140.

Motion-based behavior data that may be generated by a plurality of motions executed by the individual when continuously tracing the pattern may be captured. Motion capturing sensors included in motion-based sensor system 130 may capture the motion-based behavior data as the individual executes the plurality of motions when tracing the pattern. The motion-based behavior data includes data that is unique to a human and is necessary for a human to trace the defined pattern. Any trace of the defined pattern that is received without the generation of certain motion-based behavior data may be a significant indicator that a hacking computing system bypassed the actual tracing of the defined pattern and provided a completed trace of the defined pattern without actually tracing the defined pattern via the multi-touch display of user interface 140.

Motion-based sensor system 130 may be coupled to the multi-touch display of user interface 140 so that motion-based sensor system 130 may capture the motion-based behavior data generated as the individual engages the pattern by maintaining contact with the multi-touch display. The individual may also be within proximity of the multi-touch display so that the motion capturing sensors included in motion-based sensor system 130 that are coupled to the multi-touch display can adequately capture the motion-based behavior data generated from the plurality of motions executed by the individual when tracing the pattern via the multi-touch display. Motion-based sensor system 130 may continuously capture the motion-based behavior data beginning with the initial point of the individual's continuous trace through the end point of the individual's trace of the pattern. The plurality of motions executed by the individual that generate the motion-based behavior data may include any bodily motion and/or relation between bodily motions that occur as the individual traces the pattern. The motion-based behavior data may include any data generated from the plurality of motions as the individual traces the pattern that is unique to the individual. The motion-based behavior data may be data that are relative to the musculoskeletal and neurological systems unique to a human and cannot be executed by a hacking computing device.

The motion-based behavior data may include but is not limited to an average amount of time to complete the trace of the defined pattern, non-constant velocities in completing the trace of the defined pattern, a difference in the x-coordinates and y-coordinates of the trace of the defined pattern relative to the display of the defined pattern, and/or any other motion-based behavior data generated by the plurality of motions executed by the individual when tracing the pattern that is unique to a human and cannot be executed by a hacking computing device that will be apparent to those skilled in the relevant art(s) without departing from the spirit and scope of the present disclosure.

For example, the defined pattern depicting the letter "Z" may be dynamically displayed simultaneously with the dynamic display of the background via user interface 140. A human that completes the trace of the letter "Z" likely completes the trace in an average amount of time based on the complexity of the letter "Z" dynamically displayed simultaneously with the dynamic display of the background. Any trace of the defined pattern that is instantly received without taking an average amount of time to complete likely signifies that a hacking computing device submitted the traced pattern by bypassing the multi-touch display of user interface 140 and would be rejected from engaging the application.

A human that completes the trace of the letter "Z" likely has accelerations and/or decelerations as the human completes that trace of the letter "Z" rather than completing the trace with a constant velocity. A human would have difficulty completing the trace with a constant velocity but a hacking computing device would have difficulty completing the trace with random accelerations and/or decelerations. Any trace of the defined pattern that is received that was completed with a constant velocity likely signifies a hacking computing device submitted the trace of the defined pattern and would be rejected from engaging the application.

A human that completes the trace of the letter "Z" likely has deviations from the x-coordinates and y-coordinates of the outline of the letter "Z" displayed via user interface as the human completes the trace of the letter "Z". The likelihood is low that a human would complete the trace of the letter "Z" perfectly with each x-coordinate and y-coordinate of the trace falling within the outline of the letter "Z" but rather has a high likelihood that the at least a portion of the x-coordinates and y-coordinates of the trace would fall outside the outline of the letter "Z". Any trace of the defined pattern that is received that has each x-coordinate and each y-coordinate perfectly positioned within the outline of the letter "Z" so that no portion of the x-coordinates and the y-coordinates of the trace fall outside the outline of the letter "Z" signifies a hacking computing device submitted the trace of the defined pattern and would be rejected from engaging the application.

The amount of time taken by the individual to complete the trace of the defined pattern, the variations in velocity while completing the trace of the defined pattern, the deviation of a portion of the x-coordinates and y-coordinates that fall outside the outline of the defined pattern as displayed via user interface 140 are examples of motion-based behavior data that are based on the musculoskeletal and neurological systems unique to humans and cannot be duplicated by a hacking computing device that does not have a musculoskeletal and neurological system. Thus, adding security to ensuring a human is attempting to engage the application and not a hacking computing device. In an example embodiment, step 250 is performed by processor 610 as shown in FIG. 6 and discussed in more detail below.

Computation Power Awareness

The simultaneous dynamic display of the defined pattern and the background may be executed so that such a simultaneous dynamic display of each may occupy a specified portion of the processing power of the hacking computing device. Both the simultaneous dynamic display of the defined pattern and the background as well as to properly recognize the defined pattern and trace the defined pattern require processing power from the hacking computing device when the hacking computing device is attempting to engage the application rather than a human. The occupation of the specified portion of the processing power of the hacking computing device by the simultaneous display of the defined pattern and the background may prevent the hacking computing device from having sufficient processing power remaining to also recognize the defined pattern and then to trace the defined pattern.

The processing power required by the hacking computing device increases as the complexity of the simultaneous dynamic display of the defined pattern increases. The hacking computing device cannot succeed in recognizing the defined pattern and then tracing the defined pattern when the processing power required to do so exceeds the processing power available to the hacking computing device. As a result, even if the hacking computing device had the capabilities to recognize the defined pattern during the simultaneous dynamic display of the defined pattern and the background and to trace the defined pattern, the hacking computing device would still fail to do so without sufficient processing power remaining during the simultaneous dynamic display of the defined pattern and the background.

The processing power of the hacking computing device is the amount of computation capabilities included in the hacking computing device to execute processes. The processing power of the hacking computing device is limited and when a combination of processes to be executed simultaneously by the hacking computing device require processing power that exceeds the limit of the hacking computing device, the hacking computing device is incapable of successfully completing the processes. As a result, the complexity of the simultaneous dynamic display of the defined pattern and the background may be increased to a level there is not sufficient processing power remaining for the hacking computing device to also recognize the dynamic pattern and then trace the dynamic pattern.

Before the simultaneous dynamic display of the defined pattern and the background, the processing power of the computing device that is being used to engage the application may be assessed. Based on the processing power of the computing device, the complexity of the simultaneous dynamic display of the defined pattern and the background may be determined so that the processing power occupied by the simultaneous dynamic display reaches a specified level. The specified level of processing power may be sufficient so that the remaining processing power available to the computing device may not be sufficient to for the computing device to recognize the defined pattern and then trace the defined pattern. The computing device may be limited to engaging the application when the human brain performs the recognition and then the tracing of the defined pattern thus ensuring that the user attempting to engage the application is a human.

For example, a computing device that is being used to engage an application has its processing power assessed. The computing device is determined as having a light computation load. As a result, 50% of the processing power for the computing device is determined as the level to be occupied by the dynamic simultaneous display of the letter "Z" and the background of dots. In order to occupy 50% of the processing power of the computing device, the iterations required by the computing device to generate the dot pattern that depict the letter "Z" and the dots that are included in the background are increased. In order to increase the iterations required by the computing device, the quantity of dots displayed is increased from 100 dots to 1000 with the size of each dot decreased to a tenth of the original size.

The increase in the quantity of dots and the decrease in the size of the dots have minimal effects on the human brain in recognizing the letter "Z" so that the human user may still recognize the letter "Z" with minimal difficulty. However, the increase in complexity requires an increase in the iterations required by the computing device which occupies 50% of the processing power of the computing device. The computing device does not have sufficient processing power remaining to recognize the letter "Z" and trace the letter "Z" so that a fraudulent software program attempting to engage the application via the computing device is prevented from doing so.

The percentage of processing power occupied by the dynamic simultaneous display of the defined pattern and the background may be any percentage sufficient to prevent having any remaining percentage of processing be sufficient to recognize the defined pattern and trace the defined pattern that will be apparent to those skilled in the relevant art(s) without departing from the spirit and scope of the present disclosure. The complexity of the dynamic simultaneous display of the defined pattern and the background may be increased in any fashion to occupy the specified level of the processing power of the computing device being used to engage the application that will be apparent to those skilled in the relevant art(s) without departing from the spirit and scope of the present disclosure. In an example embodiment, the computation power awareness may be performed by a computation selector 650 as shown in FIG. 6 and discussed in more detail below.

Additional Embodiments

In an embodiment, the above discussion may be implemented into a haptic device which implements tactile feedback technology that takes advantage of the sense of touch rather than the sense of sight. Rather than the simultaneous display of the defined pattern with the background, the haptic device may provide a simultaneous generation of the defined pattern with the background via the haptic device. For example, a random background of rough and/or bumpy surfaces could be generated with the letter 'Z' represented as a smooth surface. The individual may then differentiate the defined pattern from the background using the sense of touch and trace the defined pattern via the haptic device. This is a process similar to the reading of Braille text with one's fingertips. The likelihood of a hacking computing device to be able to successfully recognize the defined pattern and trace the defined pattern via the haptic device is low. As a result, the likelihood that a human user completed the trace of the defined pattern via the haptic device is high when the trace of the defined pattern is received.

In an embodiment, the above discussion may be implemented in three-dimensions as well as in two-dimensions. A defined pattern may be simultaneously displayed with a background in three-dimensions. The individual attempting to engage the application may have a three-dimensional sensor, such as a Leap sensor by Microsoft, so that the three-dimensional sensor captures the motion-based behavior data generated by the individual as the individual attempts to complete the three-dimensional defined pattern. The human brain may still recognize the defined pattern displayed in three-dimensions relative to the background also defined in three-dimensions with minimal difficulty. However, the hacking computing device may have increased difficulty in recognizing the defined pattern displayed in three-dimensions and then completing the trace of the defined pattern in three-dimensions.

In an embodiment, a message may be generated by an individual via user interface 140. The individual may generate a message that the individual requests to send to a second individual. The individual may input the message into user interface 140. The message may then be encrypted where the message is associated with a defined pattern identified from dynamic pattern and dynamic background database 190. The encrypted message may then be sent via network 120 to a second computing device operated by the second individual. In order to ensure that the encrypted message is opened by the second individual and not a fraudulent software program, the defined pattern is first displayed simultaneously with a background via the second computing device. The second individual may recognize the defined pattern based on the capabilities of the human brain and then trace the defined pattern. After the trace of the defined pattern is received, the likelihood that the user of the second computing device is the second individual is increased so that the encrypted message generated by the original individual may then be displayed to the second individual via the second computing device.

Example Motion-Based Identity Authentication System

As shown in FIG. 6, human determination system 600 includes application generating server 150, network 120, motion-based sensor system 130, human determination computing device 110, user interface 140, and dynamic pattern and dynamic background database 190. Human determination computing device 110 includes a processor 610.

Processor 610 as described above may be used by human determination computing device 110. Examples of functionality performed by processor 610 are referenced in the above discussion. However, the above references are examples and are not limiting. The functionality of processor 610 may be performed individually by processor 610 and/or be shared among any combination of processors. As referred to herein, processor 610 may be any type of processing (or computing) device having one or more processors. For example, processor 610 can be an individual processor, workstation, mobile device, computer, cluster of computers, set-top box, game console or other device having at least one processor. In an embodiment, multiple processors may be implemented on the same processing device. Such a processing device may include software, firmware, hardware, or a combination thereof. Software may include one or more applications and an operating system. Hardware can include, but may not be limited to, a processor, memory, and/or graphical user display.

Embodiments can work with software, hardware, and/or operating system implementations other than those described herein. Any software, hardware, and operating system implementations suitable for performing the functions described herein can be used. Embodiments are applicable to both a client and to a server or a combination of both.

The breadth and scope of the present disclosure should not be limited by any of the above-described example embodiments, but should be defined only in accordance with the following claims and their equivalents.

What is claimed is:

1. A system for determining a type of a user attempting to engage an application of a computing device based on tracing of a dynamic pattern, comprising:
   at least one processor; and
   a memory coupled with the at least one processor, the memory including instructions that, when executed by the at least one processor, cause the system to:
   assess a processing power of the computing device of the user attempting to engage the application;
   determine a quantity of a plurality of structures to include in a background based at least in part on the assessed processing power;
   dynamically display a defined pattern by a user interface of the computing device, wherein a plurality of characteristics of the defined pattern change as the defined pattern is displayed by the user interface;
   display the background simultaneously with the defined pattern, wherein each of the structures in the plurality of structures has a characteristic that randomly changes independently of the other structures in the plurality of structures as the defined pattern and the background are displayed by the user interface;
   detect a traced pattern generated from the user continuously tracing the defined pattern by continuously maintaining physical contact with the user interface from an initial point on the defined pattern to an end point on the defined pattern;
   compare the traced pattern to the displayed defined pattern after the user completes the traced pattern; and
   confirm the user is a human when the traced pattern is detected.

2. The system of claim 1, wherein the instructions further cause the system to identify the defined pattern to be displayed by the user interface for the user to trace.

3. The system of claim 1, wherein the instructions further cause the system to:
   dynamically display the defined pattern as a plurality of structures of the defined pattern, wherein an accumulation of the plurality of structures of the defined pattern depicts the defined pattern as the defined pattern is displayed by the user interface.

4. The system of claim 3, wherein the instructions further cause the system to gradually change the plurality of characteristics of the defined pattern displayed by the user interface as a plurality of characteristics associated with each of the structures in the plurality of structures of the defined pattern changes.

5. The system of claim 4, wherein the instructions further cause the system to:
   continuously change a shape, size, orientation and/or location of each of the structures in the plurality of structures of the defined pattern while continuing to depict the defined pattern as the defined pattern is displayed by the user interface; and
   gradually change a direction, size, orientation and/or location of the defined pattern displayed by the user interface as the shape, size, orientation and/or location of each of the structures in the plurality of structures of the defined pattern is changed.

6. The system of claim 5, wherein the instructions further cause the system to:
   maintain the direction, size, orientation, and/or location of the defined pattern displayed by the user interface for a period of time for the user to complete the traced pattern; and
   change the direction, size, orientation and/or location of the defined pattern displayed by the user interface after the period of time is exceeded without the user completing the traced pattern.

7. The system of claim 4, wherein the instructions further cause the system to randomly change a plurality of characteristics of the background as the defined pattern and the background are simultaneously displayed by the user interface.

8. The system of claim 7, wherein the instructions further cause the system to:
dynamically display the background as a plurality of dots of the background by the user interface, wherein a plurality of characteristics associated with each of the dots of the plurality of dots of the background change as the defined pattern and the background are simultaneously displayed by the user interface.

9. The system of claim 1, wherein the instructions further cause the system to occupy a portion of computation power of a hacking computing device that is dynamically displaying the defined pattern and the background simultaneously via the user interface so that an unoccupied portion of computation power of the hacking computing device is insufficient for the hacking computing device to replicate a trace of the displayed defined pattern similar to the human.

10. The system of claim 9, wherein the instructions further cause the system to increase a complexity of the defined pattern and the background to increase the occupied portion of computation power of the hacking computing device to decrease the unoccupied portion of computation power of the hacking computing device available for the hacking computing device to replicate the trace of the displayed defined pattern similar to the human.

11. The system of claim 1, wherein the instructions further cause the system to:
capture a plurality of behaviometric characteristics associated with the user generated when the user completed the traced pattern via the user interface;
analyze the plurality of behaviometric characteristics to determine whether a variation in the plurality of behaviometric characteristics captured during completion of the traced pattern exceed a threshold;
confirm the user is the human when the variation in the plurality of behaviometric characteristics captured during completion of the traced pattern exceed the threshold; and
confirm the user is a hacking computing device when the variation in the plurality of behaviometric characteristics captured during completion of the traced pattern is within the threshold.

12. A method for determining a type of a user attempting to engage an application of a computing device based on tracing of a dynamic pattern, comprising:
assessing a processing power of the computing device of the user attempting to engage the application;
determining a quantity of a plurality of structures to include in a background based at least in part on the assessed processing power;
dynamically displaying a defined pattern by a user interface of the computing device, wherein a plurality of characteristics of the defined pattern change as the defined pattern is displayed by the user interface;
displaying the background simultaneously with the defined pattern, wherein each of the structures in the plurality of structures has a characteristic that randomly changes independently of the other structures in the plurality of structures as the defined pattern and the background are displayed by the user interface;
detecting a traced pattern generated from the user continuously tracing the defined pattern by continuously maintaining physical contact with the user interface from an initial point on the defined pattern to an end point on the defined pattern;
comparing the traced pattern to the displayed defined pattern after the user completes the traced pattern; and
confirming the user is a human when the traced pattern is detected.

13. The method of claim 12, further comprising:
identifying the defined pattern to be displayed by the user interface to the user for the user to trace.

14. The method of claim 12, further comprising:
dynamically displaying the defined pattern as a plurality of structures of the defined pattern by the user interface, wherein an accumulation of the plurality of structures of the defined pattern depicts the defined pattern as the defined pattern is displayed by the user interface; and
gradually changing the plurality of characteristics of the defined pattern displayed by the user interface as a plurality of characteristics associated with each of the structures in the plurality of structures of the defined pattern changes while continuing to depict the defined pattern as the defined pattern is displayed by the user interface.

15. The method of claim 14, further comprising:
continuously changing a shape, size, orientation and/or location of each of the structures in the plurality of structures of the defined pattern while continuing to depict the defined pattern as the defined pattern is displayed by the user interface; and
gradually changing a direction, size, orientation, and/or location of the defined pattern displayed by the user interface as the shape, size, orientation and/or location of each of the structures in the plurality of structures of the defined pattern is changed.

16. The method of claim 15, further comprising:
maintaining the direction, size, orientation and/or location of the defined pattern displayed by the user interface for a period of time for the user to complete the traced pattern; and
changing the direction, size, orientation and/or location of the defined pattern displayed by the user interface after the period of time is exceeded without the user completing the traced pattern.

17. The method of claim 12, further comprising:
randomly changing a plurality of characteristics of the background as the defined pattern and the background are simultaneously displayed by the user interface.

18. The method of claim 12, further comprising:
dynamically displaying the background as a plurality dots of the background by the user interface, wherein a plurality of characteristics associated with each of the dots of the plurality of dots of the background change as the defined pattern and the background are simultaneously displayed by the user interface.

19. The method of claim 18, further comprising:
continuously changing a shape, size, and/or location of each of the dots of the plurality of dots of the background as the defined pattern and the background are simultaneously displayed by the user interface.

20. The method of claim 12, further comprising:
occupying a portion of computation power of a hacking computing device that is dynamically displaying the defined pattern and the background simultaneously via the user interface so that an unoccupied portion of computation power of the hacking computing device is insufficient for the hacking computing device to replicate a trace of the displayed defined pattern similar to the human.

21. The method of claim 20, further comprising:
increasing a complexity of the defined pattern and the background to increase the occupied portion of computation power of the hacking computing device to decrease the unoccupied portion of computation power of the hacking computing device available for the hacking computing device to replicate the trace of the displayed defined pattern similar to the human.

22. The method of claim 12, further comprising:
capturing a plurality of behaviometric characteristics associated with the user generated when the user completed the traced pattern via the user interface;
analyzing the plurality of behaviometric characteristics to determine whether a variation in the plurality of behaviometric characteristics captured during completion of the traced pattern exceed a threshold;
confirming the user is the human when the variation in the plurality of behaviometric characteristics captured during completion of the traced pattern exceed the threshold; and
confirming the user is a hacking computing device when the variation in the plurality of behaviometric characteristics captured during completion of the traced pattern is within the threshold.

* * * * *